March 26, 1963     H. A. GEORGE     3,083,325

FAST AND SLOW SPEED DRIVE MOTOR CONTROL SYSTEM

Filed Jan. 4, 1960

*INVENTOR.*
HOWARD A. GEORGE
BY *James P. Malone*

United States Patent Office 3,083,325
Patented Mar. 26, 1963

3,083,325
FAST AND SLOW SPEED DRIVE MOTOR
CONTROL SYSTEM
Howard A. George, Connecticut View Drive,
Mill Neck, N.Y.
Filed Jan. 4, 1960, Ser. No. 277
3 Claims. (Cl. 318—102)

This invention relates to indexing means for a rotatable shaft drive and more particularly to such apparatus having means to stop the shaft at a predetermined angle of rotation.

A typical application of the present device is in the winding of electrical coils, on a mass production basis. In such apparatus the coil winding machine is set up to turn a predetermined number of revolutions in order to place a predetermined number of turns on the coil. It is desirable to start the winding at a predetermined angle relationship to the coil form and this feature is especially important in an apparatus where the coil forms are mounted on a rotatable turret, since the wire guide must be accurately positioned to permit the turret to index without interference.

The present invention generally comprises a first motor connected to rotate a shaft means to de-energize the first motor after a predetermined number of turns, and a second indexing motor connected to then turn the shaft to a predetermined angular position and then stop. The first motor is preferably a high speed motor and the indexing motor a low speed motor. The electrical control means are provided so that all that is required is to start the apparatus with a push button for each coil to be wound.

Accordingly a principal object of the invention is to provide new and improved shaft drive means.

Another object of the invention is to provide new and improved means for turning a shaft a predetermined number of turns and means for stopping said shaft at a predetermined angle of rotation.

Another object of the invention is to provide new and improved coil winding means.

Another object of the invention is to provide new and improved coil winding means comprising means to turn a shaft for winding a wire a predetermined number of turns and means to stop said shaft at a predetermined angle of rotation.

Another object of the invention is to provide new and improved means for indexing the angle of rotation of a driven shaft.

Another object of the invention is to provide new and improved means for indexing the angle of rotation of a driven shaft comprising a first high speed motor adapted to turn the shaft a predetermined number of turns, and a second low speed motor adapted to turn the shaft after the first motor has been de-energized to a predetermined angle of rotation.

These and other objects of the invention will be apparent from the following specification and drawings of which FIG. 1 is a schematic diagram of the embodiment of the invention.

Figure 1:
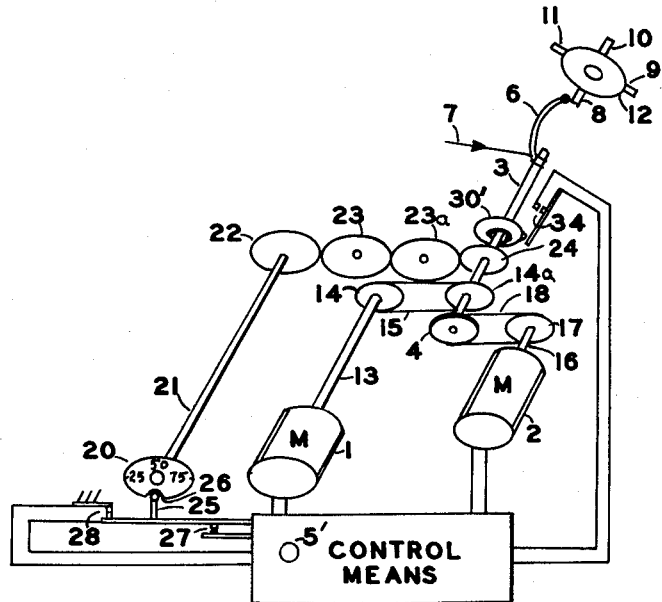

Referring to the figures the invention generally comprises a first high speed motor 1 directly belted to drive shaft 3 through pulleys 14, 14a and belt 15; a second low speed motor 2, which is connected to drive the shaft 3 through an overrunning clutch 4, and electrical control means 5 containing relay control circuits for controlling the operation. In a typical coil winding operation the shaft 3 rotatably drives a wire guide 6 which is adapted to feed the wire 7 around a stationary coil form on holder 8. A plurality of coil form holders 9, 10 and 11 may be mounted on a horizontal turret 12 for continuous production.

More specifically the motor 2 and shaft 16 are connected to the clutch 4 by means of the gear 17 and belt or chain 18.

The motor 1 is adapted to be energized by means of the switch control 5 to turn the shaft 3. Overrunning clutch 4 permits shaft 3 to rotate freely at high speeds even though motor 2 is turning slowly or is stationary. When a predetermined number of turns is accomplished the motor 1 is de-energized by means of the notched plate 20 which is geared to the shaft 3 by means of gears 22, 23, 23a and 24. After the motor 1 has turned a predetermined number of times the cam follower 25 will enter the notch 26 in the plate 20, thereby opening the contacts 27 which de-energize the motor 1 as will be more fully described in connection with the circuit of FIG. 2.

At the same time the contacts 28 are connected which energizes the indexing motor 2 to turn the shaft 3 at low speed until the cam 30' mounted on the shaft 3 opens the contacts 34 which de-energize the motor 2 thereby stopping the shaft 3 at a predetermined angle of rotation which may be adjusted by varying the angular position of the cam 30' on the shaft 3. The apparatus is then ready for another cycle.

When using a horizontal turret arrangement the turret 12 would rotate in position so that the next coil form 9 would be in position under the guide 6. The turret is preferably automatically rotated without any cutting of the wire. The turret may have many more coil forms than shown and an operator may cut and secure the ends of the wire and insert new coil forms on the holders 8, 9, 10 and 11 without interfering with the continuous coil winding operation which may be made fully automatic if desired. In practice, loading, cutting the connecting wire, and removing the finished coils may also be accomplished automatically. An axial movement of the guide 6 may be desirable in some cases but is outside the scope of the present invention.

The counting means for the motor 1 has automatic compensation for overrun as more fully described in my co-pending application directed to that feature S.N. No. 403, filed January 4, 1960, for Compensating Coil Winding Means.

Figure 2:
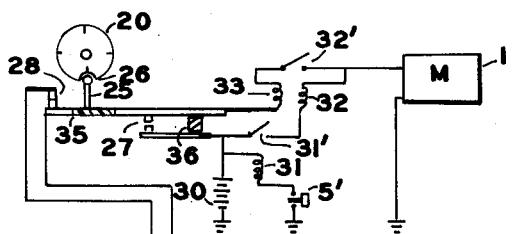
FIG. 2 is a schematic circuit diagram for the embodiment of FIG. 1.

Referring to the circuit of FIG. 2 it is as follows:

The battery 30 is connected from ground through relay coil 31 and push button 5' back to ground. The battery is also connected through switch 31' and relay coil 32 to the motor 1. The battery is also adapted to be connected through contacts 27, holding coil 33, switch 32' to the motor 1.

The operation of this part of the circuit is as follows: When the push button 5' is energized a circuit is completed from ground through battery 30, relay coil 31, push button 5' back to ground. The coil 31 causes the switch 31' to close completing a circuit from battery 30, switch 31', relay coil 32 and motor 1. This starts the motor and also closes the switch 32' so that a running circuit is completed from the battery 30 through the contacts 27, holding coil 33, switch 32' to the motor 1. When the notched wheel 20 rotates a predetermined amount the cam-follower 25 will enter the notch 26 thereby opening the contacts 27 and de-energizing the motor by opening the switch 32'. Subsequent closing of the contacts 27 by overrun of the motor will not energize the motor as the switch 32' will remain open.

The circuit for the indexing motor 2 is similar to the motor 1 circuit with the contacts 28 being substituted for the push button. In this circuit the battery 30a is connected through coil 31a and contacts 28 to ground. The battery is also connected through contacts 34, holding coil 33a, switch 32b to the motor 2. The battery 30a is also connected through switch 31b and coil 32a to motor 2.

The operation of the indexing motor 2 circuit is as follows:

When the cam-follower 25 enters the notch 26 the contacts 28 will be closed which completes a circuit to start the motor 2 from the battery 30a to relay coil 31a and contacts 28 to ground. This circuit also closes the switch 31b which completes the circuit from the battery 30a through switch 31b and coil 32a to the motor 2. This circuit starts the motor and closes the switch 32b so that the running circuit is completed from the battery 30a through the contacts 34, holding coil 33a, switch 32b to the motor 2. This circuit will be broken when the cam 30' opens the contacts 34 which will de-energize the holding coil and open the switch 32b. The motor 2 is a low speed motor so that it can be stopped at a predetermined angular position.

In the embodiment shown the motor 2 is started at the same time that the motor 1 is de-energized. This condition is not necessary as the motor 2 may be running before the motor 1 is stopped. As long as the speed of motor 1 drives shaft 3 at high speeds the drive from motor 2 is disconnected by the overrunning clutch. When shaft 3 is decelerated by de-energizing motor 1 to the speed of motor 2, the clutch is effective and causes shaft 3 to continue to revolve a portion of a turn at slow speed until contacts 34 are opened. The two control circuits are insulated by means of the insulation mounting 35 which mounts the movable portions of the contacts 27 and 28. The mounting 35 may be an insulated spring member and is mounted on the insulating block 36 connected to the frame.

Figure 3:
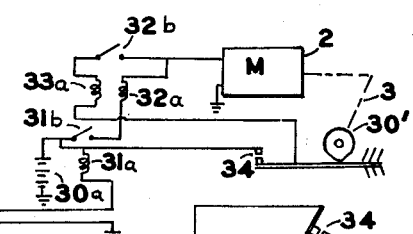
FIG. 3 is a simplified schematic circuit diagram for the embodiment of FIG. 1.
Figure 3:
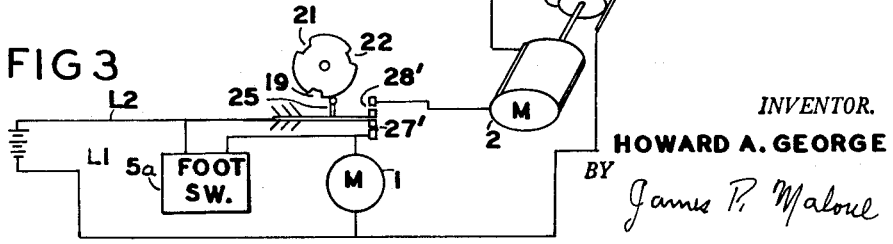

FIG. 3 shows a typical simplified circuit arrangement. The motor 1 is connected to one side of the power line $L_1$. The other side of power line $L_2$ is connected through the momentary foot switch or push button 5a to the motor. The contacts 27' are in parallel with the push button switch and they are normally closed when the cam-follower 25 is not in any one of the notches 19, 21 and 22. The notches are made wide enough so that normay overrun of the motor will not reclose the contacts 27'.

The operation of the circuit thus far is as follows:

The foot switch or push button 5a is pressed closed long enough to have the cam-follower ride out of a notch in the disc 20. Thereafter the motor 1 will continue to operate until the contacts 27 are broken when the cam-follower 25 enters the next one of the notches.

At the same time contacts 27' are broken, contacts 28' connect motor 2 to one side $L_2$ of the line and the motor 2 circuit is completed through contacts 34 to the other side of the line $L_1$.

Therefore when motor 1 is de-energized the motor 2 is started and operates at low speed until the cam 30 opens normally closed contacts 34, at the predetermined angle of rotation. In FIG. 3 the disc 22 is shown with several notches for programming the winding of a coil. For instance stops may be made for attaching tap leads to the center of the coil.

Therefore, the present invention provides means for rotating a shaft a predetermined number of turns at high speed then indexing the angular position of the shaft at low speed. The invention is not limited to coil winding apparatus but may have application in other fields. The electrical circuits are illustrative only. Practical embodiment of this invention may include braking circuits for both motors, speed controls, timers or other programming means, and suitable interaction between circuits to prevent rotation of shaft 3 when turret 12 is improperly positioned, prevent rotation of turret when wire guide 6 is in an interfering location. Operation of the entire mechanism may be sequential and automatic, or may require tripping by a suitable foot switch as a signal by the operator that the turret has been loaded with an empty coil form ready for winding. The particular electrical control features are illustrative only since the electrical control may be performed by various other equivalent electrical control circuits.

I claim:

1. Indexing means for a shaft drive comprising, a first motor connected to rotate said shaft, means to count the number of rotations of said first motor and stop said motor at a predetermined number of rotations, a second motor connected to rotate said shaft after said first motor is stopped, and means connected to said second motor to stop said second motor when said shaft is at a predetermined angle of rotation.

2. Means for indexing a driven shaft comprising a high speed motor, a low speed motor, clutch means, both of said motors being connected to drive said shaft through said clutch means, means to de-energize said high speed motor after a predetermined number of turns, and means to stop said shaft at a predetermined angle of rotation including a cam adjustably mounted on said shaft, a pair of contacts connected to stop said low speed motor, said contacts being actuated by said cam.

3. Indexing means for a shaft drive comprising, a first motor connected to rotate said shaft, means to count the number of rotations of said first motor and stop said motor at a predetermined number of rotations, a second motor connected to rotate said shaft after said first motor is stopped, and means connected to said second motor to stop said second motor when said shaft is at a predetermined angle of rotation, said last means comprises a cam mounted on said shaft and a pair of contacts connected to de-energize said motor said contacts being actuated by said cam.

References Cited in the file of this patent

UNITED STATES PATENTS

| | | |
|---|---|---|
| 1,251,286 | Rodman | Dec. 25, 1917 |
| 1,412,568 | Mortensen | Apr. 11, 1922 |
| 1,559,525 | Murphy et al. | Oct. 27, 1925 |
| 1,687,654 | Bouton | Oct. 16, 1928 |
| 2,100,284 | Kriechbaum | Nov. 23, 1937 |
| 2,244,880 | Howse | June 10, 1941 |
| 2,386,009 | Smith | Oct. 2, 1945 |
| 2,798,992 | Adler et al. | July 8, 1957 |